United States Patent [19]

Milne

[11] 3,907,672

[45] Sept. 23, 1975

[54] AEROBIC SEWAGE DIGESTION SYSTEM
[76] Inventor: George A. Milne, 45-342 Lilipuna Rd. No. 304, Kaneohe, Hawaii 96744
[22] Filed: Nov. 24, 1972
[21] Appl. No.: 309,516

Related U.S. Application Data
[63] Continuation-in-part of Ser. No. 246,253, April 21, 1972.

[52] U.S. Cl. ............ 210/7; 210/16; 210/170; 210/195; 210/197; 210/199; 210/202; 210/220
[51] Int. Cl. ..................... C02c 1/08; C02b 3/08
[58] Field of Search ......... 210/5, 7, 14, 15, 16, 170, 210/195, 197, 201, 202, 205, 218, 220, 221, 259, 320, 519, 199

[56] References Cited
UNITED STATES PATENTS

| | | | |
|---|---|---|---|
| 1,439,406 | 12/1922 | Elrod | 210/16 |
| 2,852,140 | 9/1958 | MacLaren | 210/195 UX |
| 3,236,767 | 2/1966 | Ross et al. | 210/7 |
| 3,260,368 | 7/1966 | Wagner et al. | 210/195 |
| 3,348,687 | 10/1967 | Foster | 210/195 |
| 3,415,378 | 12/1968 | Fukuda | 210/195 UX |
| 3,438,499 | 4/1969 | Reckers | 210/195 X |
| 3,487,937 | 1/1970 | Koulovatos | 210/195 |
| 3,507,393 | 4/1970 | Weis et al. | 210/195 |
| 3,560,376 | 2/1971 | Heil | 210/7 |
| 3,649,529 | 3/1972 | Walker | 210/14 X |
| 3,666,106 | 5/1972 | Green | 210/16 X |

OTHER PUBLICATIONS
Builders Report Pacific, Trade Publishing Co., Oct. 4, 1971.

Primary Examiner—Samih N. Zaharna
Assistant Examiner—Robert H. Spitzer
Attorney, Agent, or Firm—James C. Wray

[57] ABSTRACT

A self contained sewage treatment aerobic digestion system comprises a large cylindrical, horizontally oriented fiber glass tank with an influent opening near the top of one end and an effluent opening slightly lower in the opposite end. A first partition which arises from the bottom almost to the top of the tank forms with the first end wall a pretreatment chamber. Inflow and outflow openings are offset to provide uniform circulation in the chamber. A second sloping partition divides the remainder of the tank into a central aeration chamber and a final clarifier chamber. An air diffuser line is positioned upward along one side of the central chamber near the bottom of the tank to diffuse air into the aeration chamber and to promote circulation. Openings in the second partition at and beneath water level flow aerated liquid into the clarifier tank. A skimmer projecting through the second partition returns floating solids from the clarifier to the aeration chamber. An opening at the bottom of the second partition in cooperation with the sloping wall of the partition and the sloping second end wall flows precipitated solids from the clarifier back into the aeration chamber. A weir near the effluent opening controls level of fluid within the tank, and a trough between the weir and the effluent opening provides tertiary chemical treatment of the wastewater. Manways above the first partition and above the clarifier provide access to the chambers when the entire tank system is installed underground.

10 Claims, 6 Drawing Figures

/ 1

AEROBIC SEWAGE DIGESTION SYSTEM

This is a continuation-in-part of copending application Ser. 246,253, filed Apr. 21, 1972 for Sewage Treatment System by George A. Milne, of which the priority is claimed.

BACKGROUND OF THE INVENTION

Historically, sewage treatment systems for multiple unit developments have conducted raw sewage through long conduits to a place far distant from the source. The sewage is then treated in open containers to encourage the proliferation of aerobic bacteria for the digestion of the sewage by converting organic material into simpler chemical compounds through the action of enzymes produced by the living organisms. Odoriferous gases, which are contained in the sewage and which are formed be decomposition, pervade the area of the sewage treatment facility. Moreover, the large, open tanks are unsightly. Consequently, it is to the greatest advantage to provide large sewage treatment facilities which are sufficiently far from populated areas to render the distasteful esthetics of the plant inobtrusive.

As population increases, such remote areas for sewage disposal plants become less and less available. Because of the distasteful nature of the plants, it has been the practice to create large branched collection networks which are served by large centralized disposal plants. Costs of effective sewage treatment are increased by the necessity of handling a large quantity of sewage in a small area and by the expense of the large collection networks of branch sewers, main sewers, trunk sewers and interceptors which serve centralized facilitites. Discharge in outfall sewers from such facilities has been far heavier in pollutants than desired or than permissible.

Where limited amounts of funds are available for sewage treatment, the money required for construction of sewage collection and transportation systems subtracts from money available for sewage treatment. Thus, the systems of the prior art which require long range transportation of sewage to remote sewage plants have heretofore unresolved difficulties of high sewage transmission costs and inefficiency due to the need for processing large quantities of liquid at a single geographical location. New developments tend to overcrowd existing facilities and to reduce their effectiveness in treatment because of existing collection systems and existing interceptor sewers which provide ready communication to existing plants. New developments are often hampered and dictated by the availability of sewers connected to existing facilities or by the availability of land for building new treatment facilities. The most desirable developments from economic and geographic considerations are sometimes unavailing because of the lack of proper sewage collection systems.

Known small treatment plants which may be employed for industrial of housing developments employ open tanks. The esthetics of appearance and odors are major drawbacks which prevent installation of the facilities close to the waste water source. The unavailability of remote locations for installation of the small sewage systems and the expense and difficulty associated with obtaining remote locations for sewage treatment use have made such systems impractical.

Systems have been proposed for oxygenating sewage in sewer mains, trunks and interceptors to prevent sewage from becoming septic on its way to treatment facilities. Such systems augment rather than replaces large centralized collection systems.

Heretofore, sewage treatment in small installations has been accomplished by small above ground plants or by smaller below ground plants which depend upon anaerobic digestion or which depend upon electric motors to physically stir sewage within a tank.

It is desirable that waste water be treated in many steps before effluent is released to the environment. Known small systems try to combine steps to maintain their small size. Usually the results are unsatisfactory. For example, septic tanks attempt to combine sedimentation for settling of sludge with the digestion of some of the sludge in a single tank. Outflow contains dissolved and suspended materials which are only partially decomposed. Decomposition continues in the effluent with the inherent noxious odors and clogging of dispersal facilities which are associated with septic tanks.

In small stirred aerobic tanks, the treatment is accomplished entirely by aerobic bacteria. Consequently, increased air is required, with attendant noise and power consumption requirement of auxiliary pumps and stirring motors. Often the effluent is not fully treated by the time of the release.

SUMMARY OF THE INVENTION

The present invention combines all desirable steps of sewage treatment within a single tank which is self contained. The tank is divided in sections, so that the sewage may be treated in stages. In a preferred embodiment, the tank of the present invention is made of a large diameter fiber glass cylinder enclosed at opposite ends, and being buried underground with a horizontal axis and being covered by a sufficient amount of fill to disperse ground loadings over the surface of the tank and to adjacent compacted earth. The tank has an influent opening at an upper extremity of one end. A reinforcement within the tank adjacent the opening receives in slip fit a standard sewer pipe. A "T" fixed to the reinforcement directs the fluid downward and disperses the waste water with little disturbing movement through the first pretreatment chamber of the tank, which is formed between the first end wall and a vertical partition. Solids precipitate or float out of the waste water, and the waste water continues onward through a downward opening of an outflow "T" through the partition. Heavy sludge precipitates from the waste water and settles in the bottom of the pretreatment tank, where the sludge is digested by anaerobic bacteria, which proliferate in the sludge. Light floating solids float to the top of the pretreatment tank and are held there while they are operated upon by aerobic bacteria proliferating on the scum. The pretreatment tank is sufficiently large in size to slow the flow of the waste water, so that solids have sufficient time to precipitate. The waste water from which the solids have been precipitated and which still contains air and oxygen is flowed through the partition into the next adjacent chamber, which is an aeration chamber. In the aeration chamber, which is formed by a central portion of the cylindrical wall of the tank and the first partition and a second partition, dissolved and suspended materials are operated upon by aerobic bacteria in the enriched air condition of that chamber. Air is pumped downward to the bottom of the tank and is distributed through diffusers mounted on a horizontal distribution line. The distribution line is mounted upward from the bottom near one side of the tank so that bubbles create a vortex of the waste water, insuring continuous mixing of the air with the materials in the aeration chamber. The tank is designed so that the waste water remains in the aeration chamber for a considerable time, which is usually twenty-four hours or more. The waste water is then flowed through openings in the second partition slightly beneath the surface level into the third clarifier section of the tank. Flow is slowed in the clarifier to precipitate any remaining solids toward the bottom of the clarifier, and the precipitated solids, which are rich in aerobic bacteria, are collected in a hopper-like arrangement at the bottom of the clarifier and are flowed through an opening at the bottom of the second partition back into the aeration chamber. Floating solids are picked up by a skimmer in the clarifier and are flowed back into the aeration chamber for further digestion.

Clear effluent flows over a weir into a trough where a chemical purifying additive is added and out of the trough through an effluent line for disposal or reuse of the purified liquid. The tank is provided with a vent near an upper portion of the cylindrical wall in the vicinity of the first partition for removing methane gas and unused air. The exhaust gases may be employed for combustion and producing a usable power.

Manways with cover plates are provided around openings in the upper portion of the cylindrical wall near the first and second partitions for access to the chambers.

Broad objectives of the invention are accomplished by providing a large, self contained sealed tank with a waste water influent opening into a first pretreatment settlement chamber and with an outflow from that chamber into an aeration chamber where oxygen is added to the air bearing waste water from which solids have been precipitated and wherein suspended and dissolved solids are acted upon by aerobic bacteria while circulation within the aeration chamber is encouraged and then flowing the aerated waste water into a tank where flow is slowed and where materials are again precipitated to clarify the liquid, and then flowing the clarified liquid out of the tank.

These and other objects and features of the present invention are apparent in the disclosure, which includes the specification with its appendant claims and the drawings.

DETAILED DESCRIPTION OF THE DRAWINGS

Figure 1:
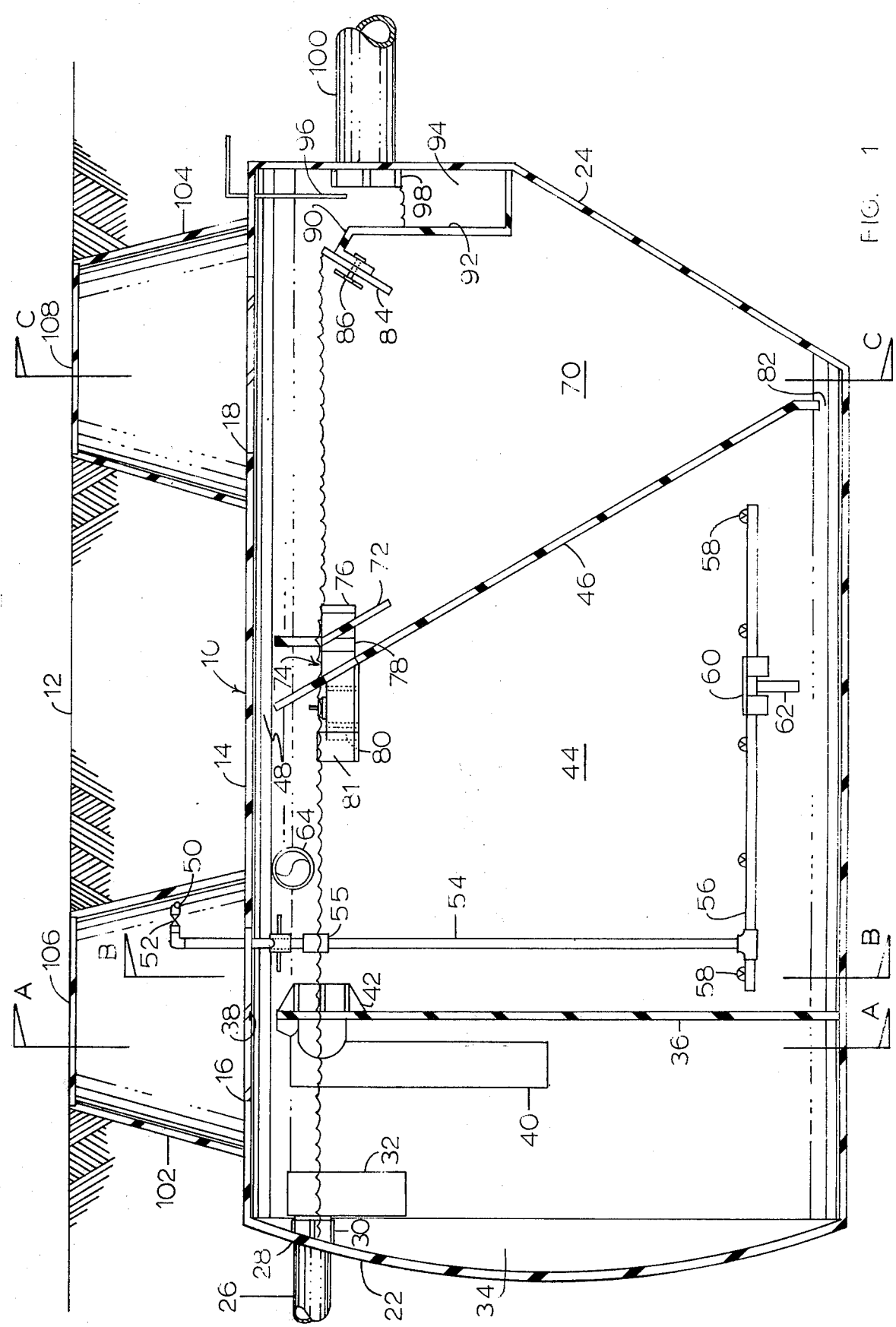
FIG. 1 is a vertical cross section through a complete waste water treatment tank of the present invention.

Referring to FIG. 1, a 1500 gallon per day flow capacity fiber glass underground aerobic digestive, four-stage waste water treatment system is generally referred to by the numeral 10. The entire system is buried approximately two feet beneath the surface of the ground, which is generally indicated by the numeral 12.

The compacted backfill over and around the tank provides force distribution, so that heavy vehicles may be driven over the ground and so that the ground may be used as a playground or parking area. The system comprises a large cylindrical walled tank 14 which is approximately six feet in diameter. In a preferred embodiment, the tank and all of the appurtenances are made of molded fiber glass formed first as a cylindrical wall 14 with upward opening access holes 16 and 18 and first and second ends 22 and 24, which are welded in place after interior partitions and fittings are installed.

Figure 2:
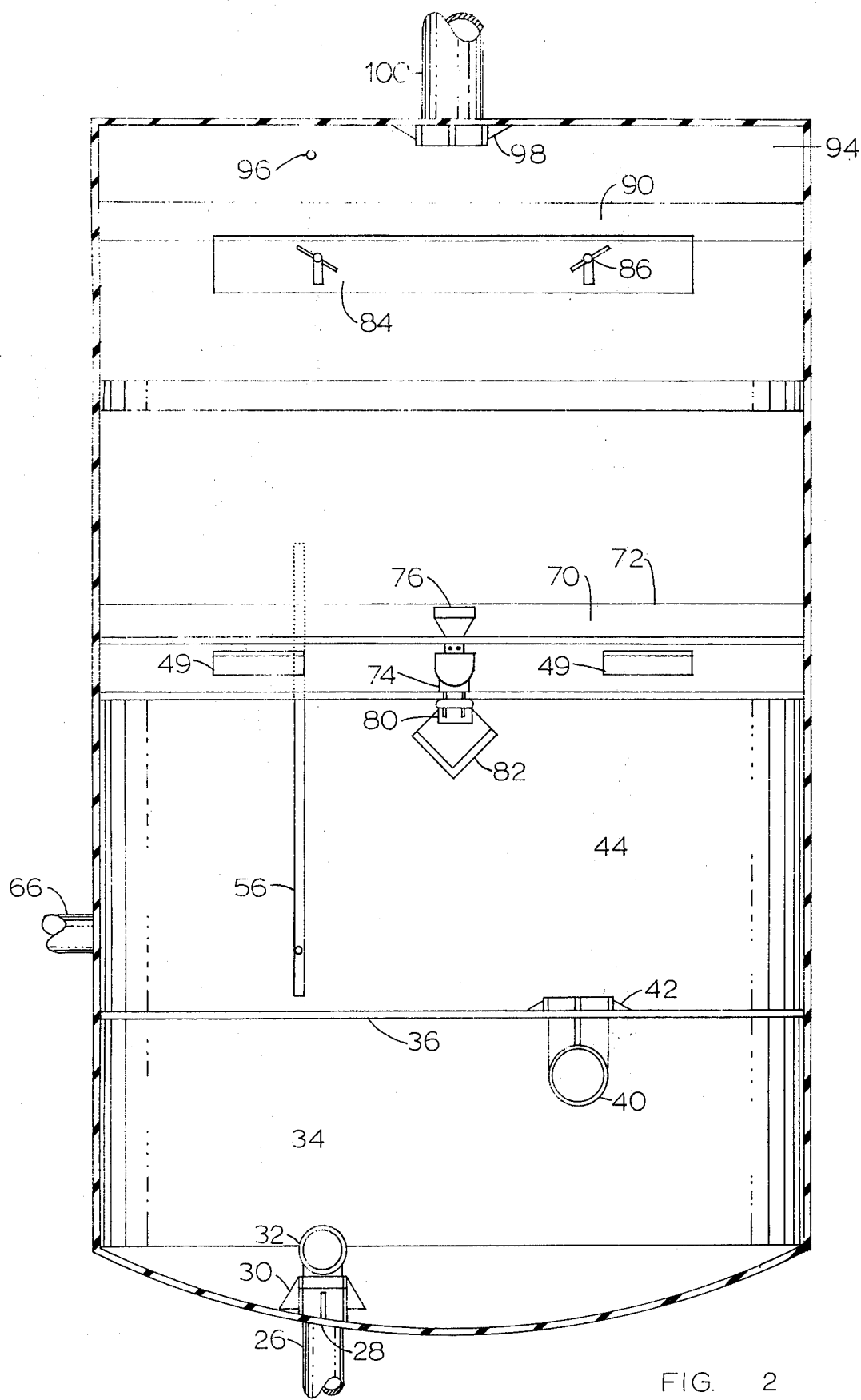
FIG. 2 is a partial horizontal cross section taken through the tank shown in FIG. 1.

As shown in FIGS. 1 and 2, an influent waste water pipe 26 is fitted into an opening 28 in the end wall 22. A reinforced holder 30 is secured to the end wall. A "T" 32 with open upper and lower hands is mounted internally in the mounting means 30 to communicate with pipe 26. Waste water flowing through pipe 26 flows downward through "T" 32 and is exhausted into the pretreatment tank 34, which is formed between first partition 36 and first end wall 22. The flow of the waste water is slowed in the first pretreatment chamber, and solid materials are precipitated into a thick sludge at the bottom of the chamber. Floating solids in the waste water float to the top of pretreatment chamber 34, and the waste water from which solids have been precipitated is flowed through "T" 40, which has open upper and lower ends and through an opening in an upper portion of partition 36. Reinforcement 42 is attached to the partition 36 to hold the "T" in place. The partition 36 extends completely across the cylindrical wall with the exception of a small space 38 at the top of the partition, which is best shown in FIG. 3.

Figure 3:
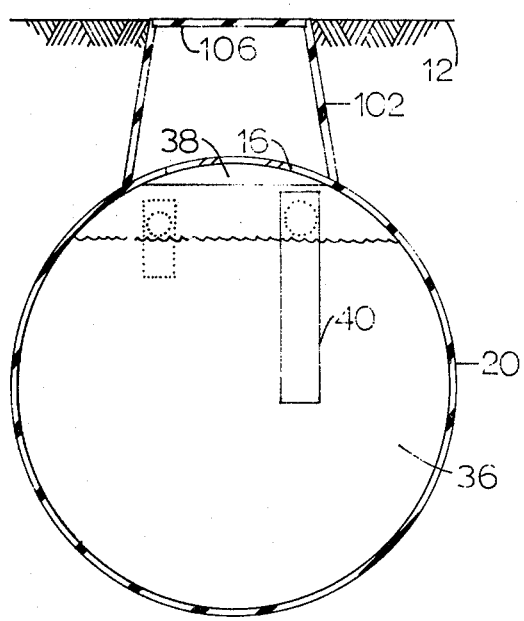
FIGS. 3, 4 and 5 are vertical cross sections of the tank shown in FIG. 1 taken in planes transverse to the plane of the cross section of FIG. 1 at lines A—A, B—B and C—C, respectively.
Figure 4:
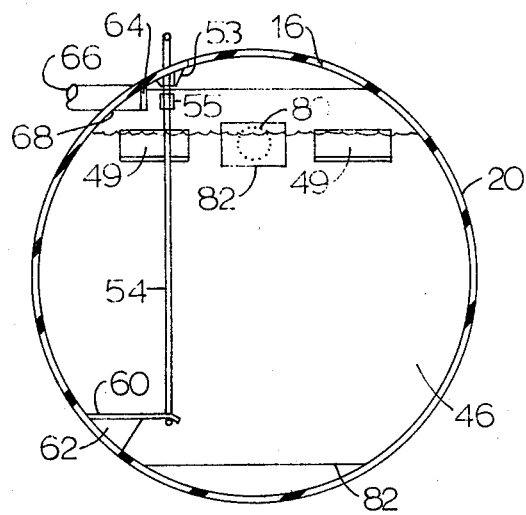

As appears in FIGS. 1, 2 and 3, the lower openings in "T" 32 and 40 are spacially offset laterally and vertically to encourage full exchange of liquid in tank 34 and to discourage a direct flow of the liquid from the inlet "T" to the outlet "T" 40. Sludge which is precipitated in tank 34 is acted upon and digested by anaerobic bacteria which reduce the sludge to water soluble materials and gas, notably methane gas. Materials which have been made soluble flow through outflow "T" 40 into the second aeration chamber. The aeration chamber 44 is defined by a central portion of the cylindrical wall 14, the first partition 36 and the second partition 46, which extends across the cylindrical wall with a space 48 at its top. A pump not shown in the drawing provides air under pressure through line 50 and valve 52. A union 55 connects the supply line to vertical supply line 54, which is joined by a "T" to horizontal distribution line 56. As best shown in FIG. 4, which is a cross section along the line B—B of FIG. 1, the supply line 54 and distribution line 56 are mounted near a bottom of the cylindrical all and slightly upward and along one side of the wall, so that air flowing out of diffusers 58 creates bubbles which tend to lift the mass along one side and thereby to rotate and circulate the mass to insure complete aeration and proliferation of aerobic bacterial. Support 62 and clamp 60 are formed of fiber glass materials and are connected to the side wall. A vent 64 is connected to the cylindrical wall 14, and a long pipe carries the vented gas to a distant location, such as to the top of a building.

As best shown in FIGs. 2 and 4, opening 49 in sloped partition 46 just at and below the waste water level in the tank, conduct the aerated water from the aeration tank to a third clarifier chamber 70. Solids which are suspended in the waste water passing through openings 49 are precipitated when the flow is slowed substantially in the clarifier chamber 70. Baffle 72 extends across the upper section of the cylindrical wall parallel to an upper portion of partition 46. The purpose of the baffle 72 is to direct the incoming waste water downward away from the water surfaces in clarifier 70. Skimmer 74 returns solids floating in the clarifier chamber 70 be receiving the solids in opening 76, floating the solids back through skimmer body 78 and through a one-way surface effect actuated apparatus and out through opening 80. A small V-shaped baffle 81 attached to the skimmer which is extended outward from opening 80 prevents flow from chamber 44 toward the opening 80. Solids which precipitate from the liquid in clarifier 70 are concentrated by the complementary sloping portions of partition 46 and end wall 24. The solids are then forced through the opening 82 at the bottom of partition 46 back into aeration chamber 44, where further aerobic digestion of the solids occurs. The continuous recycling of highly aerated solids back into tank 44 insures the continuous supply of aerobic bacteria from the solids, making the aeration chamber 44 continuously rich in aerobic bacteria which digest the sewage. The level of waste water in treatment tank 10 is controlled by horizontally elongated weir 84, which can be adjusted in height by adjustment means 86. The clear effluent flows over the top of weir 84, downward along partitions 90 and 92, which extend across the cylindrical wall 14 to form with end wall 24 an additive treatment chamber 94. An additive pipe 96 is positioned above tank 94 to drop additive chemicals suchh as chlorine, releasing materials into the tertiary treatment tank. The clear, purified liquid then flows outward through effluent line 100, which is mounted in a reinforced effluent opening 98 in the end wall of the tank.

Figure 5:
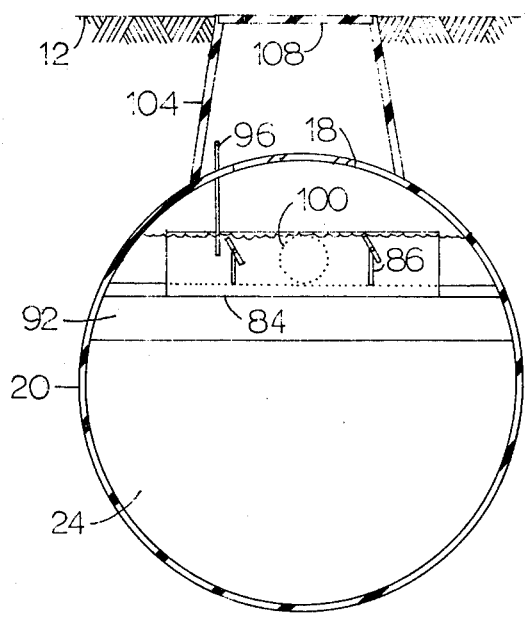

As shown in FIGS. 1, 3 and 5, manways 102 and 104 extend upward from access openings 16 and 18 and are covered by removable covers 106 and 108 at ground level 12.

Figure 6:
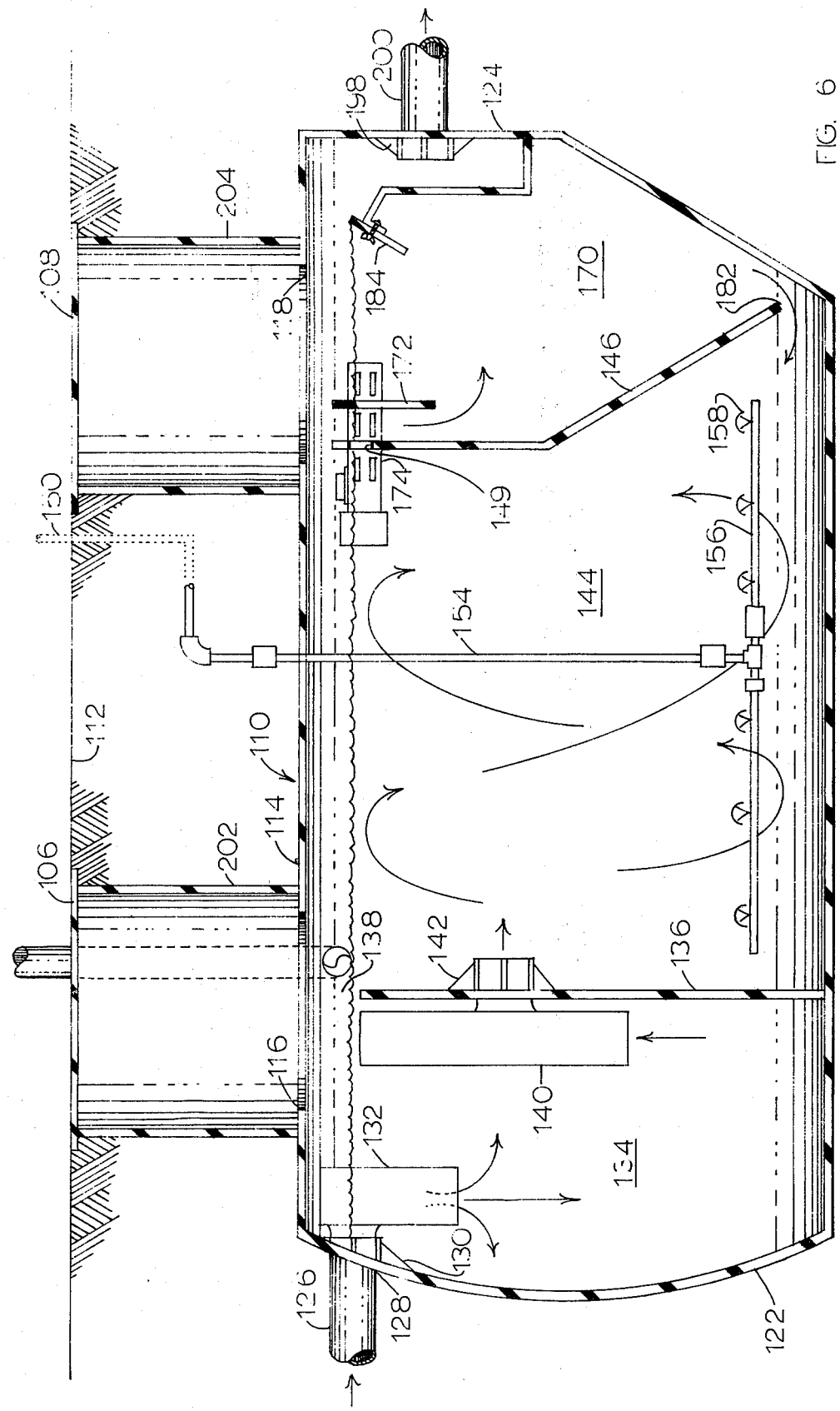
FIG. 6 is a horizontal cross section of a second modification.

In FIG. 6, a 750 gallon per day, self contained, four-step treatment tank is generally indicated by the numeral 110. The tank is buried approximately two feet below ground level 112 and has a cylindrical wall 114, which transfers loads of the compacted backfill laterally without damage to the tank. Access openings 116 and 118 are provided in an upper portion of the cylindrical wall near opposite ends. End walls 122 and 124 are welded in place after the interior fittings have been installed. Preferably, the tank and all of its internal elements are formed of light-weight fiber glass materials. A first interior partition 136 extends across the cylindrical wall 114, with the exception of a small area 138 at its top. A waste water collection pipe 126 is slipped into an opening 128, which is surrounded by reinforcement 130. "T" 132, with open upper and lower ends, directs the incoming waste water downward in the pretreatment chamber 134. In the embodiment of the example of FIG. 6, the pretreatment tank has a capacity of approximately 150 gallons. Flow through the tank is slow, and solids are precipitated, forming a sludge on the bottom, which is adjusted primarily by anaerobic bacteria and partially by aerobic bacteria, which are supported by air from the incoming waste water and the incoming line 126. The waste water flows out of chamber 134 through "T" 140, which is open at its upper and lower ends and into the next chamber through reinforced opening 142. An air supply line 150 is served by a heavy duty blower (not shown), which is in continuous operation, or by a pressurized tank (not shown) continually resupplied by air or other oxygenaceous material. The air or oxygen is forced downward through supply line 154 and out along horizontal distribution line 156 and is released through diffusers 158. The waste water from which most solids have been removed flows in a spiral vortex through aeration chamber 144, as encouraged by the air bubbles released from diffusers 158. In the present example, the aeration chamber has a volume of approximately 425 gallons. The oxygen-rich liquid within the tank supports the proliferation of aerobic bacteria, which are continuously resupplied from the activated sludge returning through opening 182 at the bottom of partition 146. As the waste water flows out from tank 144 through opening in partition 146, flow is greatly slowed in clarifier tank 170, which has a capacity of approximately 190 gallons. Sludge precipitates from waste water in the clarifier and flows back through opening 182 into the aeration chamber for resupplying the aerobic bacteria to the aeration chamber and for further digestion. Baffle 172 insures that fluid flowing into the clarifier chamber circulates within the clarifier before spilling over weir 184. Floating solids are returned through skimmer 174, which has an operation similar to the skimmer described with reference to the FIG. 1 embodiment. Effluent flows out of reinforced opening 198 into effluent pipe 200. Manways 202 and 204 surround openings 116 and 118 respectively and extend upward from the openings to ground level. Checkered covers 106 and 108 close the manways at ground level.

The inflow and outflow "T"s of the pretreatment chamber may be laterally offset as shown in the FIG. 1 modification to discourage direct flow between the inflow and outflow "T"s. The opening in the first partition may be offset laterally to encourage the circulation flow in the aeration chamber. In the FIG. 6 embodiment, the opening in the first partition is centrally positioned so that the inflowing waste water is injected into the center of the vortex in the aeration chamber.

Outflow opening in the second partition are located at water level and extend downward slightly below the water level so that floating solids are held back in the aeration chamber by the openings, while the liquid freely flows through the openings. The currents within the aeration chamber created by the vortex flow and by the baffle at the end of the skimmer in the aeration chamber promote lateral flow by the openings in the second partition to keep the openings free of floating debris.

A holder trough and an additive line may be added near effluent opening 198 in the manner of the FIG. 1 embodiment if tertiary treatment is desired in the FIG. 6 embodiment.

While the invention has been described in part by the reference to tanks of particular sizes, tanks of many different sizes may be employed. While the invention is particularly useful for complete sewage treatment systems for single family units and multiple family units, it has application to sewage treatment systems of varied sizes. The system of the present invention is particularly useful where a developer must provide interim sewage treatment facilities before a final system is provided. The self contained sewage treatment systems of the present invention are readily uncovered, disconnected from influent and effluent lines, emptied, and lifted for reuse at another location. While the system of the present invention has been described for use with modern, light-weight strong materials such as fiber glass, it will be obvious that the system may be constructed of any convenient material, such as reinforced concrete, metal or other plastic materials.

Although the present invention has been described in part with reference to specific example, modifications and variations may be constructed or used without departing from the scope of the invention, which is precisely defined only in the following claims.

I claim:

1. Self contained closed aerobic sewage treatment apparatus comprising a closed tank having a cylindrical wall oriented around a generally horizontally axis and having first and second end walls joining the cylindrical wall in completion of a closed body, a sewage inflow opening in the first end wall, an effluent outflow opening mounted in the second end wall, a first generally vertical partition extending upward within the tank from a lower portion of the cylindrical wall to a position spaced slightly beneath an upper portion of the cylindrical wall, thereby forming a first chamber between the first partition and the first end wall for pretreatment of the incoming sewage, an opening in the first partition for conducting liquid material out of the first chamber, a second partition extending from a position spaced upward from a lower portion of the cylindrical wall and near the second end wall generally upward to a position spaced from an upper portion of the cylindrical wall, thereby dividing the tank into a second central chamber and a third chamber near the second end wall of the tank, aeration means extending downwards in the central chamber and along a bottom of the central chamber for releasing oxygen bearing material into sewage in the second chamber for aerating the sewage and promoting upward circulation, an opening in the second partition for permitting sewage to flow from the central chamber to the third chamber and means for returning solid materials from the third chamber to the second chamber, whereby solid materials returns to the central chamber and liquid effluent flows through the effluent outflow opening in the second end wall, a first modified "T" connected to the inflow opening in the first end wall and extended downward for directing flow of sewage downward in the first chamber, a second modified "T" having a short horizontal leg portion connected to the opening in the first vertical partition and having an elongated portion extending downward into the first chamber and opening at a remote end, whereby sewage flows upward through the elongated portion and then through the leg portion into the central chamber, wherein the upper ends of the "T"s open to the space at the top of the first chamber above sewage level in the first chamber, an upward opening in the cylindrical wall above the first generally vertical partition and a vertical manway, connected around the upward opening and extending upward therefrom, and a plate covering the manway at its top, thereby providing access to the first chamber and to the central chamber, an opening in an upper portion of the cylindrical wall above the third chamber, and a manway surrounding the opening and extending upward therefrom and a cover on the manway for providing access to the tank in the area of the third chamber, a bottom wall connected to the second end wall below the effluent outflow opening and a third partition connected to the bottom wall, thereby forming a trough adjacent the effluent outflow opening whereby effluent flows into the trough from the third chamber and out of the trough through the effluent opening.

2. The sewage treatment apparatus of claim 1 wherein the aeration means comprises a vertical air supply line extending downward through the cylindrical wall into the central chamber and a horizontal distribution line connected to the vertical supply line at a lower extremity thereof, the distribution line terminating near opposite ends of the central chamber and being positioned upward from the bottom of the chamber and along one side thereof, and diffusers mounted at intervals along the distribution line for releasing air into the sewage in the central chamber along one side of the cylindrical wall for aerating the mass and encouraging rotation of the mass within the central chamber, and further comprising a vent opening through the cylindrical wall near an upper portion thereof above a sewage level in the tank and an elongated vent pipe connected to the vent opening for carrying gases away from the vicinity of the tank.

3. The sewage treatment apparatus of claim 1 further comprising outflow means and skimmer return means connected to the opening in the second partition for passing treated sewage from the central chamber to the third chamber and for returning skimmed solids from the third chamber to the second chamber, and further comprising a baffle extending across an upper portion of the third chamber adjacent the skimmer return means for directing flow into the third chamber away from the skimmer means, whereby floating solids are recirculated back into the skimmer means.

4. The sewage treatment apparatus of claim 1 wherein the second partition slopes downward from an area near the center of the tank to a position slightly above and inward from a juncture of the cylindrical wall and the second end wall and wherein the second end wall is sloped oppositely toward the second partition for concentrating precipitated solids in the third chamber and for urging the solids through the space at the bottom of the second partition back into the central chamber for further aerobic digestion.

5. The sewage treatment apparatus of claim 4 wherein the second partition has a sloped lower half and a substantially vertical upper half and wherein the second end wall has a sloping lower half and a substantially vertical upper half.

6. The apparatus of claim 1 further comprising an elongated adjustable weir oriented in a transverse direction across the tank and positioned above the effluent opening in the second end wall and slightly spaced inward from the effluent opening for controlling the level of the liquid within the third chamber.

7. The apparatus of claim 6 and further comprising an additive line extending through the tank and terminating above the trough for releasing additive into liquid within the trough for chemically treating liquid before outflow through the effluent opening.

8. The method of waste water treatment comprising flowing waste water into a unitary self contained tank, having a cylindrical wall oriented around a horizontal axis, slowing the flow and holding the waste water in a pretreatment settlement chamber having a cylindrical wall within one longitudinal end of the tank, precipitating solids and sludge from the waste water in the pretreatment chamber and collecting sludge in a curved bottom of the pretreatment chamber digesting the sludge in the pretreatment chamber, flowing the waste water from the pretreatment chamber through an opening near the top of a partition into a relatively large cylindrical wall aeration chamber within the tank, introducing oxygen near a bottom of the aeration chamber in a line along a bottom portion of the cylindrical wall, and slowly circulating waste water within the aeration chamber cylindrically within the cylindrical wall, thereby encouraging mixture of the waste water with oxygen and promoting proliferation of aerobic bacteria, further digesting waste materials in the waste water, flowing the waste water out of the aeration chamber into a clarifier chamber, slowing flow of the waste water in the clarifier chamber, precipitating solids from the waste water in the clarifier chamber, gathering precipitated solids at the bottom of the cylindrical wall, and returning the precipitated solids which are rich in aerobic bacteria to the aeration chamber, collecting clarified liquid in a trough along an end wall and flowing clarified liquid from the clarifier chamber out of the tank through an effluent opening, and further comprising directing influent downward through an open top "T" in the pretreatment tank and flowing waste water upward through an open top "T" and out from the pretreatment chamber into the aeration chamber, accessing the pretreatment chamber and the aeration chamber through an opening in the cylindrical wall and a manway attached around that opening above the partition separating the pretreatment and aeration chambers, and accessing the clarifier chamber through an opening in the cylindrical wall and a manway above the clarifier chamber.

9. The method of claim 8 further comprising skimming solids from the surface of the clarifier chamber and returning skimmed solids to the aeration chamber.

10. The method of claim 8 further comprising flowing waste water from the clarifier chamber into a tank, holding waste water in the tank and adding a chemical, thereby purifying the waste water before flowing the waste water ouf of the effluent opening and out of the tank.

* * * * *